UNITED STATES PATENT OFFICE.

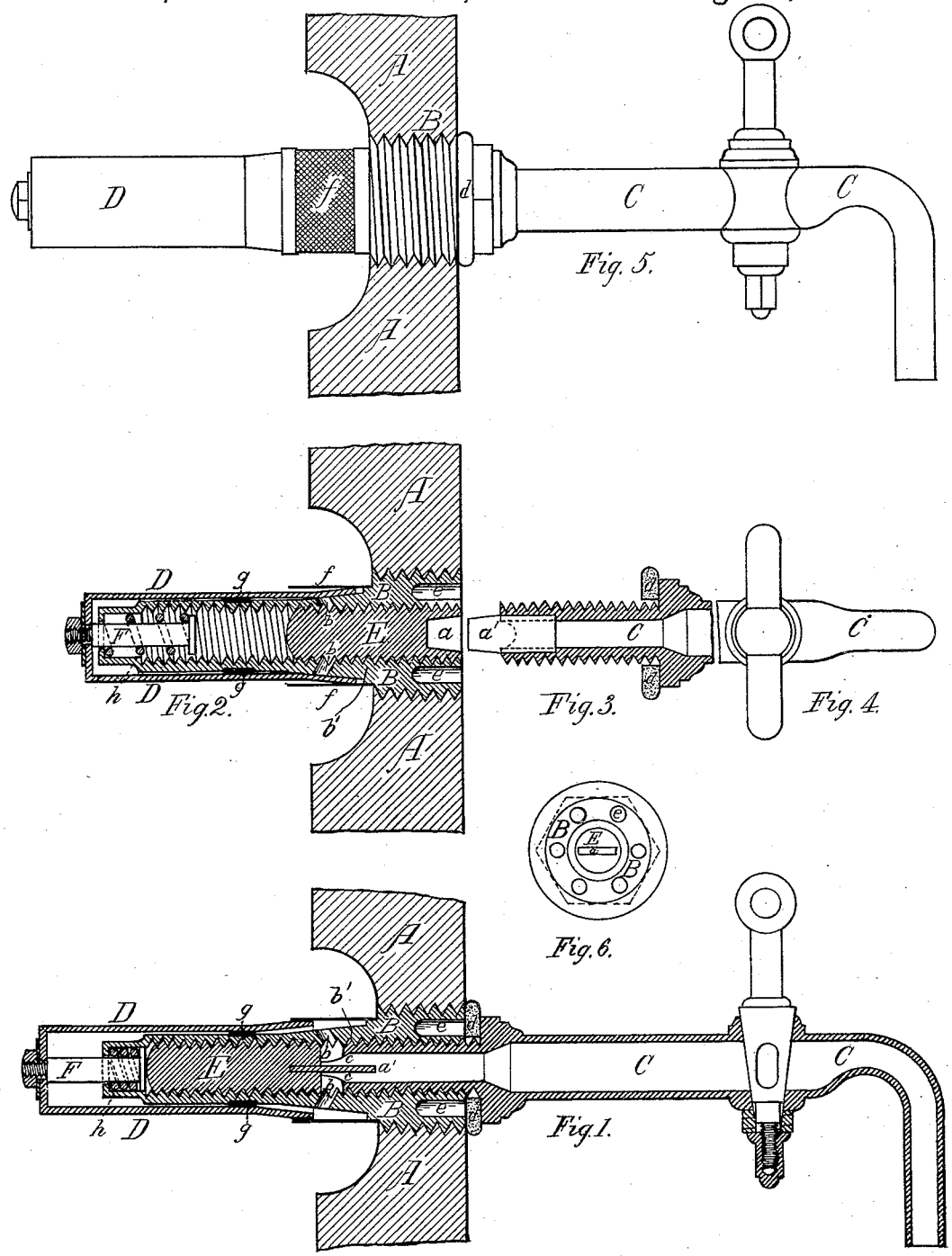

CHARLES THEODORE EMERSON, OF LAWRENCE, MASSACHUSETTS.

FAUCET AND FAUCET-BUSHING.

SPECIFICATION forming part of Letters Patent No. 408,831, dated August 13, 1889.

Application filed February 9, 1888. Serial No. 263,546. (No model.)

*To all whom it may concern:*

Be it known that I, CHARLES THEODORE EMERSON, a citizen of the United States, residing at Lawrence, in the county of Essex and Commonwealth of Massachusetts, have invented a new and useful Improvement in Faucets and Faucet-Bushings, of which the following is a specification.

My invention relates to improvements in faucet and faucet-bushings for all effervescent liquids, including porter, ale, and beer; and the objects of my improvements are, first, the form and construction of the bushing which is attached to the cask and the manner of applying the faucet, which may be applied to or removed from the bushing at any time by inexperienced persons with perfect safety and without any loss of the contents of the cask; second, the bushing is provided with two independent plugs or stoppers, one the cylindrical or cup stoppers, which is upon the outside of the bushing and inside the cask, and the metallic screw-plug, which is on the inside of the bushing, each stopper acting independently of and as a check upon the other—*i. e.*, if the cylindrical or cup stopper should from any cause fail to operate, the metallic screw-plug would act independently and perform the required duty, or vice versa, and when both operate they act together and the duty is doubly performed; third, that in applying the faucet each and every part of the bushing is acted upon, the metallic plug passes the perforations in the bushing upon the inside and forces the cylindrical or cup stopper in, opening the perforations on the opposite or outside of the bushing thereafter and permitting the liquid to pass through them into the faucet; fourth, that in removing the faucet the screw-plug follows it back until it is flush with the outer face of the bushing, for a purpose to be hereinafter described, and also permits the cylindrical or cup stopper with the aid of a spiral spring to assume its normal position and close the perforations on the outside of the bushing, and when the faucet is entirely removed the screw-plug is also in its normal position and the cask securely plugged with two plugs or stoppers and perfectly air-tight; fifth, that by keeping the cask securely plugged at all times it is kept from the action of the elements and protected from all impurities and preserved pure and sweet, and if the faucet should be removed before the contents of the cask are entirely withdrawn the part remaining is preserved in its normal condition. I attain these objects by the mechanism illustrated in the accompanying drawings, in which—

Figure 1 is a vertical section of the bushing and faucet with the faucet applied. Fig. 2 is a sectional plan of the bushing with the faucet withdrawn; Fig. 3, a sectional plan of that part of the faucet that is designed to couple to the screw-plug in the bushing. Fig. 4 is a top view of a part of the faucet representing the spigot. Fig. 5 is a side elevation of the bushing and faucet complete as applied and when in use. Fig. 6 represents the finished end of the bushing as applied to the cask.

Similar letters refer to similar parts throughout the several views.

In the figures, A represents in section a portion of the cask with my improved bushing applied thereto. The said bushing B is externally screw-threaded for a short distance at its outer end, that it may be screwed firmly into the bung-hole, and is screw-threaded interiorly for the greater part of its length, as shown in Figs. 1 and 2. Fitting loosely in an opening in the inner end of the bushing B is a short piston F, surrounded by the spiral spring $h$, and to the outer threaded end of the piston is firmly secured by a suitable nut and washer the cylindrical or cup stopper D, fitting snugly upon the external surface of that portion of the bushing within the cask and adapted to move longitudinally thereon. The spring $h$ acts normally to keep the said stopper D at the inner limit of its longitudinal movement, covering the external surface of the bushing, as in Fig. 2.

As shown, the portion $b'$ of the bushing is conical and has perforations $b\ b$ therein, and the inner end of the cylindrical stopper D is also conical to the same degree, that it may fit closely over the portion $b'$ when normally acted upon by the spring $h$, and thereby tightly close the perforations or openings $b\ b$. An annular packing $g$ of asbestus or other suitable material is inserted between the bushing and the stopper D to prevent any of the liquid passing into the bushing without first passing through the strainer $f$, attached to the bushing and surrounding the conical portion of the same and of the stopper D. This strainer may be of wire-gauze or a finely-perforated metallic plate.

A metallic screw-plug E is fitted into the interior of the bushing, and has in its outer face a transverse recess $a$, with which the projection $a'$ of the faucet C engages in applying the same, forming a coupling therefor.

In the outer face of the bushing are recesses $e$, near its periphery, in which a toothed wrench may be inserted for applying and removing the said bushing.

In Fig. 2 the normal condition of the parts within and surrounding the bushing is shown, the faucet C being removed and the perforations $b\ b$ closed at each end.

The bushing B is applied to the cask A, as represented in the drawings, Figs. 1 and 2.

In order to apply the faucet, it must be coupled with the metallic plug E by inserting the projection $a'$ into the recess $a$ of the said plug, and after it has been properly coupled, by turning the faucet C, also screw-threaded and contiguous thereto, the screw-plug E is turned also and with the faucet passes into the bushing B, and by continuing to turn the opposite end of the screw-plug E comes in contact with the piston F, and it is forced inward and out through the end of the bushing by the pressure of the plug E upon it until the faucet has been turned into operative position by the gasket $d$ upon the end of the faucet coming in contact with the outer face of the bushing B. The cylindrical or cup stopper D, being rigidly connected with the piston F, as described, is moved inward with it, thereby opening the outer ends of the perforations $b\ b$ in the bushing B, the inner ends being opened thereafter when the plug E has taken the position shown in Fig. 1, thereby permitting the liquid to pass uninterruptedly to the faucet, whence it will pass through the openings $c\ c$ therein. By the action of the plug E upon the piston the spiral spring is compressed and remains in that position until the faucet is removed, when it comes back to its normal position and forces the cylindrical or cup stopper into its normal position, thereby closing the outer ends of the perforations $b\ b$ in the bushing B, and consequently the cask. By the outward movement of the screw-plug E the perforations $b\ b$ in the bushing B are closed on the inside almost or quite at the same time that the cylindrical or cup stopper closes them upon the opposite side, therefore making a double stopper or plug. In removing the faucet the opposite action takes place in every part; therefore only one point need be considered—namely, that the cylindrical or cup stopper is the one that controls the flow of the contents of the cask, and that it is the last to open when the faucet is applied and the first to close upon its removal.

It will be seen that when the faucet C is withdrawn the outer face of the plug E is brought flush with the outer face of the bushing B, the plug in moving outwardly to such final position acting to effectually clean out the interior of the bushing of any sediment or impurity that may have been deposited therein during the flow of the liquid therethrough.

The form of the faucet required to combine with the bushing and to properly operate it and all its parts is shown in the drawings, Figs. 1 and 3.

Faucets of any design may be used with such changes as may be necessary to have them couple with the metallic plug and operate the different parts contained in the bushing. Therefore I do not claim an entire new faucet; but I do claim—

1. The bushing B, conical shoulder $b'$, and perforations $b$ therein, and the strainer $f$, surrounding the said shoulder, combined with a removable faucet, the cup-stopper D, having a flaring end within the strainer and closely fitting upon said shoulder, closing the outer ends of the said perforations, a packing interposed between the bushing and stopper, piston F, spring $h$, and screw-plug E, having its outer face flush with the outer face of the bushing when the faucet is withdrawn, substantially as and for the purposes set forth.

2. The combination, with a bushing having perforations adapted to be closed at each end by a cylindrical stopper and a screw-plug, respectively, of a strainer surrounding the inner end of said stopper and extended beyond the outer ends of said perforations, substantially as described.

CHARLES THEODORE EMERSON.

Witnesses:
ADOLF P. VORHOTZ,
MOSES HOWARD AMES.